Feb. 28, 1967    W. D. RITCHIE    3,306,240
CHEMICAL INCORPORATOR
Filed July 1, 1965    3 Sheets-Sheet 1

William D. Ritchie
INVENTOR.

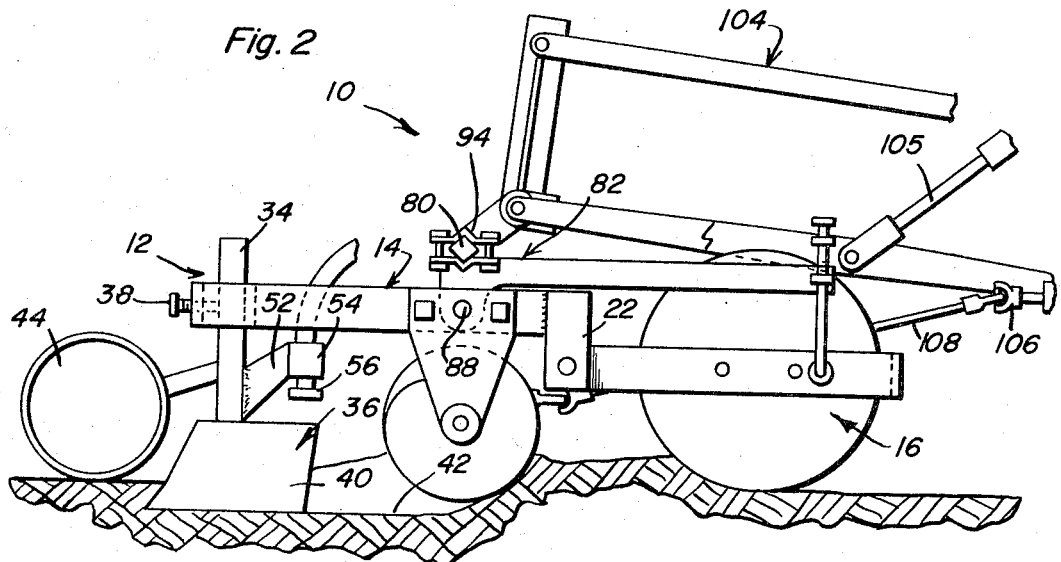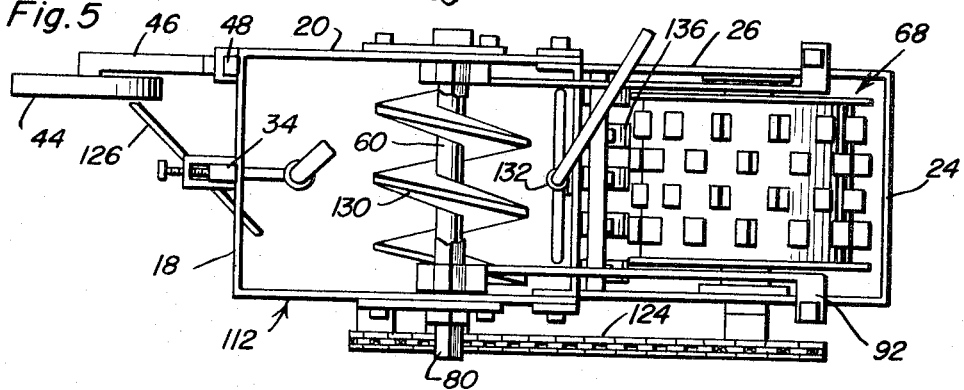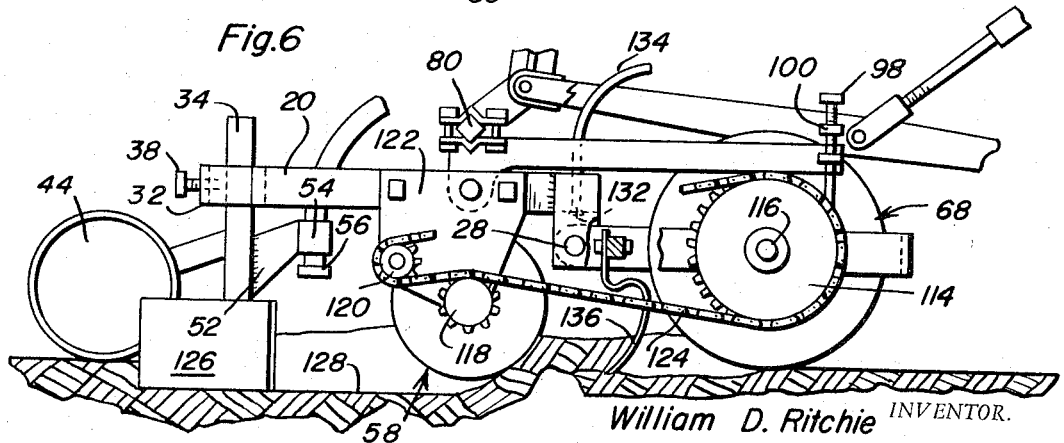

Feb. 28, 1967   W. D. RITCHIE   3,306,240
CHEMICAL INCORPORATOR

Filed July 1, 1965   3 Sheets-Sheet 3

William D. Ritchie
INVENTOR.

United States Patent Office 3,306,240
Patented Feb. 28, 1967

3,306,240
CHEMICAL INCORPORATOR
William D. Ritchie, Rte. 1, Box 82,
Prosser, Wash. 99350
Filed July 1, 1965, Ser. No. 468,753
10 Claims. (Cl. 111—6)

The present invention is concerned with a soil preparation device, and more particularly concerns an apparatus uniquely adapted for the incorporation of one or more layered bands of chemicals, as would be of particular significance in the preparation of seed beds.

It is a primary object of the instant invention to, in addition to the actual incorporation of the chemical or chemicals into the soil, below the surface thereof, also provide for a complete turning and mixing of the soil thereabove so as to physically prepare the soil for the reception of the seeds and the maximum propagation thereof.

Another highly significant object of the instant invention resides in the ability of the apparatus to be adjusted so as to provide multiple individual layers of chemicals.

Also, it is an object of the instant invention to provide for the incorporation of the chemicals into the soil over a relatively wide area located at a predetermined depth below the earth's surface, the soil initially being removed to the desired depth and, after the introduction of the chemical, the earth being thoroughly mixed and introduced back over the chemical layer and suitably packed.

Further, it is an object of the instant invention to provide for the performance of the particularly described related functions supra utilizing a single vehicle.

In conjunction with the above object, it is also an object of the instant invention to provide for the simultaneous operation of a series of laterally aligned vehicles or units so as to simultaneously prepare multiple seed rows.

In addition, it is an object of the instant invention to provide a basic apparatus which will enable the placing of two layers of chemicals with a single pass of the machine.

Likewise, of particular significance with regard to the instant invention is its unique construction which produces a highly efficient device combining relative operational simplicity, structural stability and heretofore unavailable advantages.

Basically, the chemical incorporator of the instant invention includes a unit, used either individually or in a gang with similar units, having an elongated generally rectangular frame capable of being suspended from a suitable tool bar in a manner so as to allow for movement about a horizontal axis generally paralleling the tool bar. Mounted on the forward end of the frame is a vertically adjustable furrow opener or plow blade capable of forming a relatively wide generally flat bottom trench. This plow blade is followed immediately by the discharge nozzle of a chemical spraying unit, this nozzle being located at a substantial height above the bottom of the formed groove so as to provide for the introduction of a wide band of the particular chemical contemplated so as to span the entire width of the groove. Incidentally, it will be appreciated that this chemical can be of any desired type, for example, a weedicide, insecticide or fertilizer. Mounted directly behind the chemical introducing nozzle is either one or two laterally directed feed augers, each having a helically orientated flight thereon directed so as to return the earth originally displaced by the plow with this returning earth being thoroughly stirred and mixed so as to provide a suitable seed bed. This auger means projects a sufficient distance beyond the lateral plane of the discharge end or ends of the plow so as to ensure an engagement with and return of the originally outwardly directed soil. In addition, the auger means has the lower extremity thereof located above the normal horizontal plane of the bottom of the plow so as to ensure a proper filling of the groove rather than a mere working of the soil at the bottom of the groove. Finally, the furrow closing auger means are followed by an enlarged packing wheel contemplated to provide a properly packed bed for the reception of the seeds. If so desired, the rotation of the auger means can be effected directly from the packing wheel, as against being effected from the power take-off of a conventional farm towing vehicle. Further, that portion of the frame mounting the packer wheel is to be pivotally mounted to a portion of the frame mounting the various above described elements positioned forward of the packing wheel.

In addition, the instant invention also contemplates the incorporation of a second chemical incorporating apparatus mounted transversely across the frame between the soil returning auger means and the packer wheel, this consisting of a plurality of flexible spring steel ground scratching and stirring fingers in conjunction with a second chemical discharge nozzle located immediately forward thereof. The positioning of this means immediately behind the auger means allows the second chemical to be easily incorporated into the loosened and mixed soil, this of course normally occurring at a lesser depth than the depth at which the first chemical is introduced, before a final packing of the soil.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of one of the units;

FIGURE 5 is a top plan view of a slightly modified form of incorporator illustrated as a single unit; and FIGURE 6 is a side elevational view of the incorporator of FIGURE 5.

Figure 1:
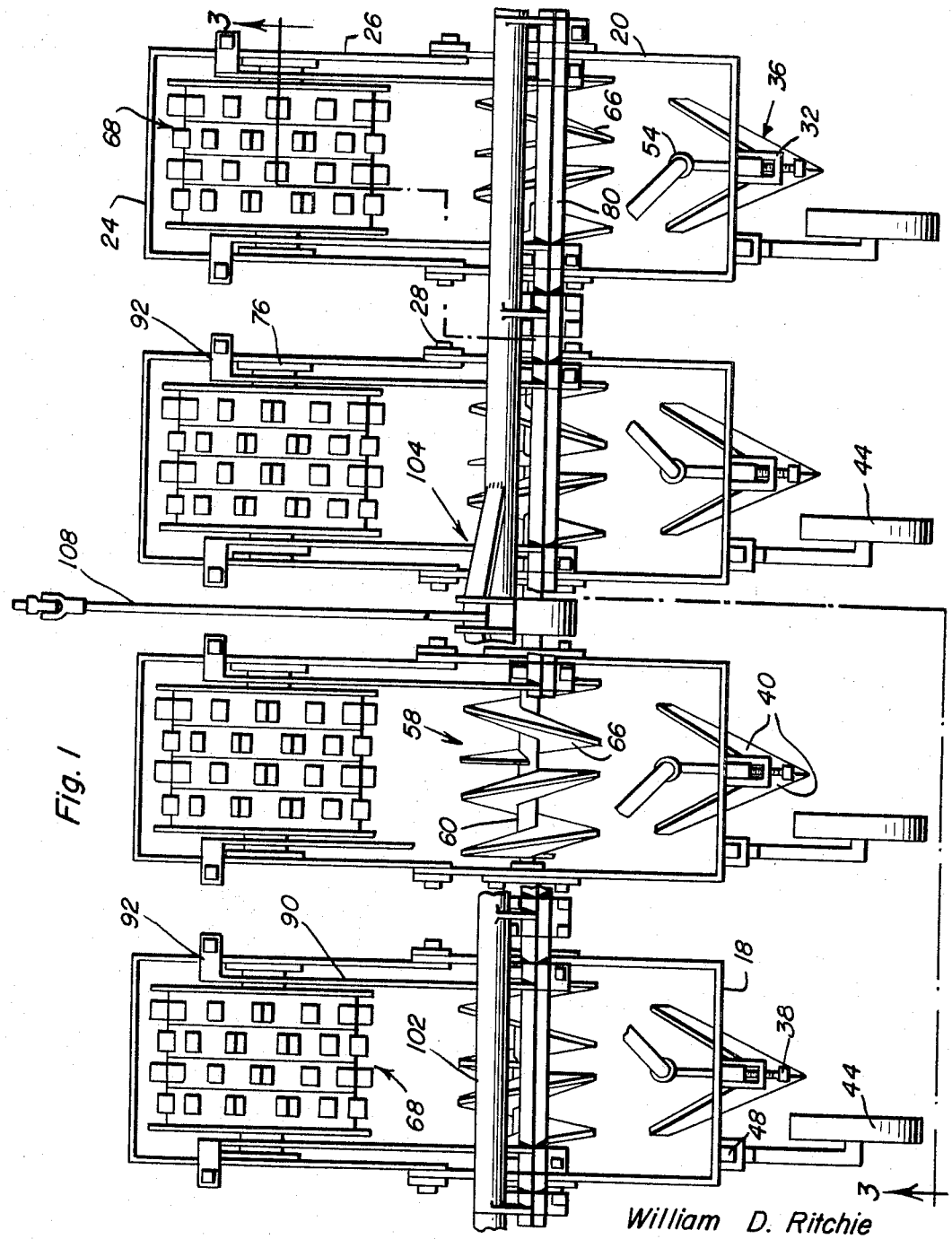
FIGURE 1 is a top plan view of a gang of the chemical incorporators comprising the instant invention.
Figure 4:
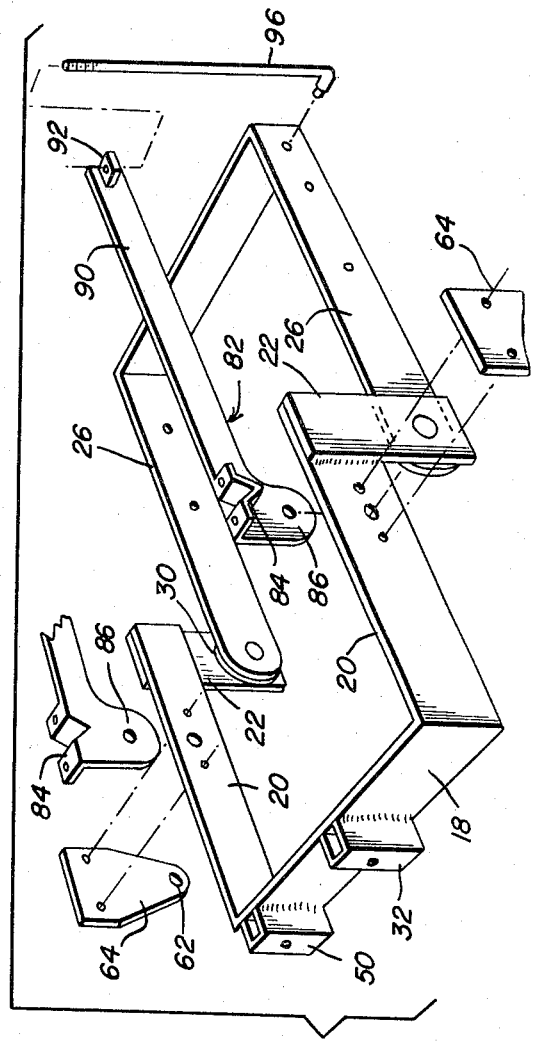
FIGURE 4 is an exploded perspective view of various portions of an individual chemical incorporating unit with the actual ground-working implements removed.

Referring now more specifically to the drawings, reference numeral 10 is used to designate the basic unit, either used by itself or in a gang with similar units as best seen in FIGURE 1. The basic unit or apparatus 10 includes an elongated generally rectangular frame 12 consisting of forward and rearward generally U-shaped sections 14 and 16. The front section 14 includes a straight front flat bar 18 and a pair of side bars 20 projecting rearwardly from the opposite ends of the front bar 18 parallel to each other and terminating in rigid depending side plates 22. The rear section 16 includes a straight rear bar 24 and a pair of forwardly projecting side bars 26 extending from the opposite ends of the rear bar 24 parallel to each other with the forward ends of these forwardly extending side bars 26 being pivotally engaged, as at 28, for movement about a transversely extending horizontal axis, to the lower portions of the depending plates 22. As will be appreciated from the exploded perspective view of FIGURE 4, suitable bearing washers 30 can be provided as needed.

Figure 3:
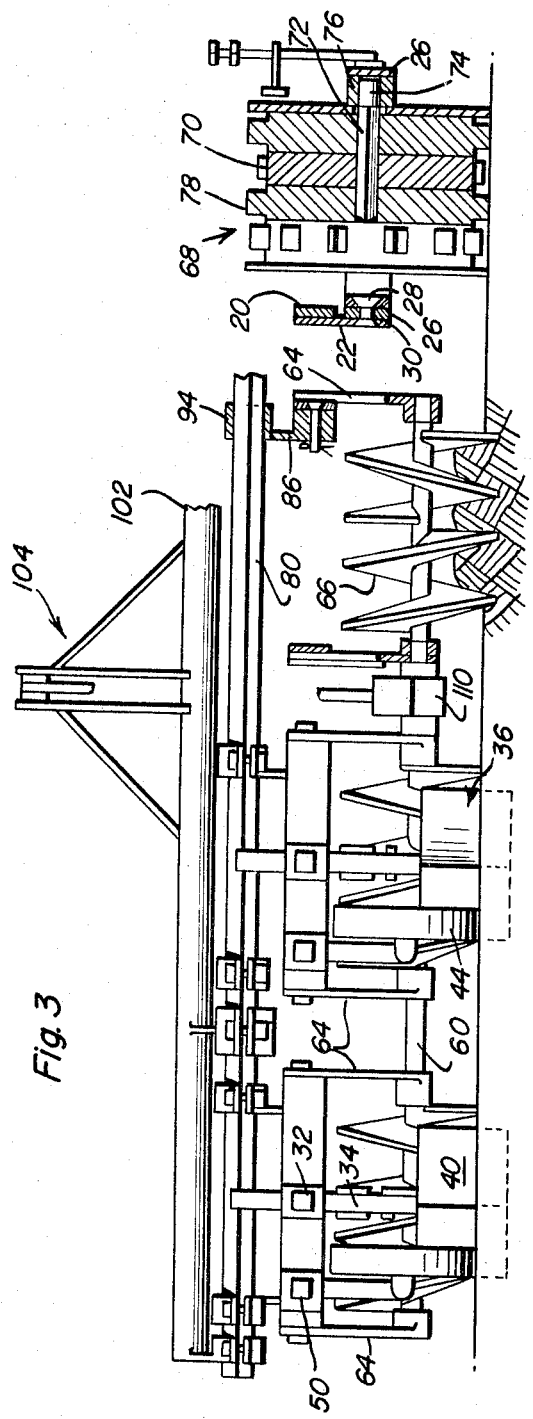
FIGURE 3 is a front elevational view, with portions broken away, taken substantially on a plane passing along line 3—3 in FIGURE 1.

Fixed centrally to the forward face of the forward bar 18 is a vertical socket-forming member 32 which receives, vertically therethrough, a plow standard 34 which in turn mounts, rigidly on the lower portion thereof, a plow or furrow opener 36. The plow standard 34 is vertically adjustable within the socket-forming member 32, thereby varying the depth of the plow 36, and is locked in any of a plurality of vertically adjusted positions by a threaded lock bolt 38 threaded within the forward face of the member 32 and clamping the standard 34 against the forward face of the bar 18. The plow 36 itself, in the specific form of the apparatus 10 illustrated in FIGURES 1–3, is to consist of a pair of rearwardly diverging blades 40 having a flat bottom so as to define a relatively wide flat bottom furrow or trench 42 with the earth being discharged laterally to both sides of the plow 36. Incidentally, as will be appreciated from the plan view of FIGURE 1, as well as the elevational view of FIGURE 3, the discharge edges of the plow blades 40 are located inwardly of the opposite sides of the frame, so as to in effect provide for a discharge of the dug soil within the lateral limits of the frame.

In order to maintain the desired depth, a free-wheeling depth control wheel 44 is positioned forward of one side of the frame 12, through an angularly directed arm 46 rigid with a vertically extending standard 48 received within a socket-forming member 50, similar to member 32, fixed to the forward face of the front bar 18 at one end thereof, both of the standards 34 and 48 being preferably rectangular in cross section so as to correspond to the cross section of their sockets, thereby eliminating any tendency for either the depth control wheel 44 or the plow 36 to rotate or move out of alignment. The wheel standard 48 will also of course be locked in any of a plurality of vertically adjusted positions in a manner similar to that used in conjunction with the plow standard 34.

The plow standard 34 also includes a rearwardly and upwardly extending rigid arm 52 terminating, at its inner end, in a suitable collar 54 which receives a discharge nozzle 56. This nozzle 56, communicated with any suitable, preferably pressurized, source of chemical, such source being conventional and not illustrated, is oriented specifically a substantial distance above the base of the plow 36, and of course rearward and inward of the leading faces thereof so as to provide for a wide pattern of chemical discharge contemplated to cover the full width of the trench or furrow formed by the plow 36. In this manner, a wide band or layer of chemical, whether weedicide, insecticide or fertilizer is provided.

Located rearward of the chemical discharge nozzle 56 is a transversely orientated furrow closing auger 58, the shaft 60 of this auger spanning the forward frame section 14 and having the opposite ends thereof rotatably supported through suitable journaling openings 62 in the lower ends of a pair of opposed depending auger-mounting plates 64 fixed to the opposed side rails 20. With reference specifically to the embodiment of FIGURES 1–3, it will be noted that the auger 58 has oppositely directed helically wound blades or flighting 66, each extending inwardly from the extreme side of the frame 12, and outwardly of the vertical plane of the corresponding discharge edge of the corresponding plow blade 40, to substantially the longitudinal centerline of the apparatus 10. Further, the individual helical blades 66 are orientated so as to, upon a rotation of the auger 58 in a direction opposite from that of the direction of travel of the apparatus 10, reintroduce the previously outwardly directed soil into the furrow or trench 42. The use of auger means, in addition to effecting a reintroduction of the soil, ensures a complete mixing of the soil and a breaking up of any clods, etc. In this manner, the soil introduced into the trench will be completely pulverized so as to provide a highly suitable seed bed, in addition to covering the chemical layer introduced immediately forward of the auger means. Incidentally, it will be noted that the auger flights 66 are raised above the lower plane of the plow 36, and subsequently above the bottom of the furrow 42. This is of particular significance in that the full width chemical layer or barrier which has been laid down is not disturbed. At the same time, it ensures a proper introduction of the returned soil in conjunction with the aforedescribed complete mixing and tilling of the soil so as to not merely effect a replacing of the soil in the same condition as it was when the furrow was opened by the plow 36. As will be appreciated, terminating the discharge ends of the plow 36 inward of the sides of the frame 12, and consequently inward of the outer ends of the auger means, ensures that substantially all of the soil will be returned. While the oppositely directed flights 66 have been illustrated on a common shaft, it will of course be appreciated that a pair of aligned oppositely directed augers can also be utilized.

Located rearward of the furrow-closing auger means is an enlarged packing roller 68 formed of a plurality of cast iron packer rings 70 mounted on a common shaft 72, the opposite ends 74 of which are rotatably mounted within bearing blocks 76 fixed to the opposed inner faces of the forwardly projecting side rails 26 of the rear frame section 16. This packing wheel or tamper 68 includes a plurality of tamping teeth 78 which, although not specifically illustrated as such, are preferably to be of the tapered self-cleaning type. By mounting the packing roll 68 on the rear frame section 16, it will be appreciated that free vertical movement of the packer wheel, within a limited range, is provided for without affecting the adjusted depth of the remaining implements mounted on the forward frame section 14. Incidentally, it will be noted that this packer wheel 68 travels at substantially ground level.

The apparatus 10 is to be suspended from a suitable tool bar 80 extending transversely across the frame 12 in spaced relation thereabove and generally parallel to the auger shaft 60. The engagement between the tool bar 80 and the apparatus frame 12 is effected through a pair of clamp members 82. Each of these clamp members 82 includes a seat portion 84 conforming to and receiving the lower portion of the tool bar 80, an integral depending lug portion 86 lying adjacent the inner face of the corresponding front frame section side bar 20 and pivotally pinned thereto as at 88, and an integral rearwardly projecting arm 90 extending rearward beyond the tamping roller axle 72 where it terminates in a laterally directed apertured lug 92. In addition, in order to effect the actual clamping to the tool bar 80, a rigid bar-conforming strap 94 overlies the tool bar 80 above the seat portion 84 and is directly bolted thereto as indicated in the drawings. The mounting of the frame 12 in this manner will allow a desired degree of movement therebetween with the depth-gauging wheel 44 at the forward end tending to maintain the predetermined furrow depth.

The lug 92 projecting laterally from the clamp member arm 90 on each side of each of the apparatus frames 12 is specifically provided so as to receive a vertically elongated stop or limit rod 96, the lower end of which is angularly bent and fixed to the adjoining section side rail 26. The upper end of the rod 96, in addition to an enlarged head member 98, also includes a vertically adjustable stop 100, for example a nut threaded on an externally threaded portion of the rod 96. In this manner, by adjusting the height of the adjustable stop 100 on the rod 96, the range of movement of the packer wheel carrying rear section 16 can be regulated. Further, it will also of course be appreciated that, through the stops 100 along the opposite sides of the section 16, this section can be fixed in a raised position so as to disengage the packer wheel 68 from the ground for, as an example, road travel during which the remainder of the apparatus 20 will also be raised through the lift mechanism of the towing vehicle.

While the above described apparatus can be used as a single unit, it will be noted that it has been illustrated in a gang arrangement with three similar units wherein the tool bar 80 is continuous across and accommodates all four units 10, as does the auger shaft 60, this auger shaft 60 of course having, within the lateral limits of each unit or apparatus 10, the aforedescribed pair of oppositely directed auger flights 66. Further, although mounted from a single tool bar, it will be appreciated that, through the aforedescribed pivotal connections, a desired degree of independent movement between the adjacent units 10 is possible, thereby easily accommodating ground irregularities which might occur within the path of one or more of the units 10. In the gang arrangement, it will be noted that the tool bar 80 itself is rigidly clamped below an elongated transversely extending bar or pipe section 102 which constitutes a portion of the towing vehicle lift system 104, this towing vehicle being, for example, a tractor of the type normally provided with hydraulic lift arms operating through lift links 105. By the same token, the normally provided tractor power take-off 106 can be used, through a universal linking rod 108 and a suitable gear box 110, to drive the auger shaft 60 and the individual auger means in each of the units 10. With such a hitch arrangement, it will be appreciated that the entire gang of units can be simultaneously raised with the stops 100, associated with each unit 10, preventing an excessive downward pivoting of the rear frame section 16.

Turning now specifically to FIGURES 5 and 6, it will be noted that various modified features have been illustrated therein, while retaining the basic construction, as will be appreciated from the use of like reference numerals to indicate like parts. Initially, it will be noted that FIGURES 5 and 6 disclose a single unit 112, similarly mounted from a tractor supported tow bar 80, wherein the driving of the auger shaft 60 is not taken directly from the power take-off of the towing vehicle. On the contrary, the driving of the auger is achieved through a gear and chain arrangement directly from the packing or tamping roller 68. This is accomplished by the provision of an enlarged gear 114 on a longitudinally projecting end of the packer shaft 116 and a similar, although smaller, gear 118 fixed on a projecting end of the auger shaft 60, along with an idler gear 120 rotatably mounted on an enlarged auger-mounting plate 122 which is secured to and depends from one of the forward section side bars 20. The drive chain 124 is entrained about the packing wheel gear 118 and about the idler gear 120 with the lower run thereof passing over and drivingly engaging the upper portion of the auger gear 118 whereby a reverse driving of the associated auger shaft 60 will result from the rolling movement of the wheel 68 along the ground, in a manner which will be readily appreciated from FIGURE 6 of the drawings.

Another modified feature illustrated in FIGURES 5 and 6 is the provision of a single blade 126 on the plow standard 34, this blade being inclined to the longitudinal axis of the frame and having an effective width substantially equal to the width of the aforementioned plow 36 so as to, in effect, provide a flat bottom furrow or trench 128 having a flat bottom and a width substantially equal to the furrow 42 with the discharge soil being located to one side thereof. By the same token, the helically wound auger blade or flighting 130 is provided on the auger shaft 60 so as to move the soil from the plow discharge side of the furrow transversely thereacross while at the same time producing a complete mixing and pulverizing of the soil. This flighting of course extends transversely beyond the discharge end of the plow blade 126 which in turn is located inward of the corresponding side of the unit frame so as to ensure a return of all, or substantially all, of the originally displaced soil subsequent to the introduction of the wide band or layer of chemical through the nozzle 56.

Finally, FIGURES 5 and 6 illustrate a second chemical incorporating means in the form of a second discharge nozzle 132, of course suitably communicated with a chemical supply through a supply pipe 134, mounted so as to direct a discharge of the desired chemical on the mixed and pulverized returned soil immediately behind the auger means with this second introduced chemical being subsequently scratched or mixed into the soil by a transverse line of resilient spring steel teeth 136 penetrating the loose soil to a predetermined depth immediately prior to the final packing of the soil by the following packing roller 68. In this manner, it will be appreciated that two layers of chemicals can be simultaneously introduced, the first layer being in the form of a solid wide band which is subsequently covered over by the returned pulverized soil, and the second layer constituting in effect a physical mixing of the chemical into the soil in spaced relation above the first layer. Suitable mounting bars will of course be used in centrally locating the second spray nozzle 132 and the row of teeth 136.

From the foregoing, it will be appreciated that a highly novel ground-working implement has been described, the primary function of this device being the incorporation of a wide band of desired chemical at a predetermined depth and the subsequent covering of the chemical layer with turned and worked soil so as to provide a suitable bed for the reception of seeds. Of particular significance is the fact that the device or machine of the instant invention can be adjusted so as to successively provide multiple layers of incorporated chemicals as needed. Likewise, one form of the instant invention provides for the simultaneous incorporation of two independent chemical layers through the provision of chemical incorporating means between the means for returning the worked soil and the means provided for producing a finished packing thereof.

The foregoing is considered illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A ground-working apparatus comprising an elongated frame, furrow opening means mounted on and depending from the forward portion of said frame for effecting an outward lateral movement of soil, material discharge means mounted on the frame rearward of said furrow opening means and in alignment therewith, furrow closing means mounted on said frame rearward of said discharge means for effecting an inward lateral movement of soil, and soil packing means mounted on said frame rearward of said furrow closing means, said furrow closing means comprising an elongated feed auger, said auger including at least one soil mixing and moving blade helically wound thereon for effecting a return of the soil initially moved outward by the furrow opening means.

2. The apparatus of claim 1 including a second material discharge means mounted rearward of the furrow closing means and forward of the soil packing means, and soil stirring means located between the second material discharge means and the soil packing means.

3. The apparatus of claim 1 wherein said frame includes a rear section, and means pivotally mounting said rear section on the remainder of the frame for pivotal movement about a generally horizontal axis, said packing means being mounted on the pivotally mounted rear section for generally vertical movement therewith relative to the furrow opening means, discharge means and furrow closing means mounted on said remainder of the frame.

4. The apparatus of claim 3 wherein said furrow opening means comprises a plow including a mounting means and a blade means, said blade means having a leading edge, at least one discharge edge, and a generally planar lower edge contemplated to define a substantially flat bottomed furrow.

5. The apparatus of claim 4 wherein the discharge edge of the plow blade means is located laterally inward of the corresponding end of the helically wound auger blade.

6. The apparatus of claim 5 including at least one mounting member pivotally engaged with the frame and projecting thereabove for rigid attachment to a tool bar, the pivotal engagement with the frame being forward of the pivotally mounted rear frame section, said mounting member including a rearwardly projecting portion overlying the rear frame section, and means engaged between this rearwardly projecting portion and the rear frame section so as to limit the pivotal movement of this rear frame section.

7. The apparatus of claim 6 wherein said plow blade means includes a pair of diverging blade sections for directing the soil laterally outward in opposite directions, said auger including a pair of oppositely wound blades thereon for simultaneously moving the previously outwardly directed soil inward from opposite sides of the frame.

8. The apparatus of claim 6 wherein said soil packing means comprises a packing wheel rollable in response to engagement with the ground, and drive means engaged between the packing wheel and auger for effecting a reverse rotation of the auger in response to a rolling of the wheel.

9. The apparatus of claim 6 including a vertically adjustable depth control wheel mounted on the forward end of the frame.

10. The apparatus of claim 6 in combination with at least one additional substantially duplicate apparatus positioned laterally thereof and in alignment therewith, a single elongated tool bar spanning both apparatus, and a pair of said mounting members engaged between each apparatus frame and the tool bar.

References Cited by the Examiner

UNITED STATES PATENTS

| | | | |
|---|---|---|---|
| 375,365 | 12/1887 | Dow | 172—532 |
| 2,027,502 | 1/1936 | Weismuller | 111—1 |
| 2,719,498 | 10/1955 | Goolsby | 111—7 X |
| 3,170,421 | 2/1965 | Norris et al. | 111—1 |

ABRAHAM G. STONE, *Primary Examiner.*

ROBERT E. BAGWILL, *Examiner.*